(12) United States Patent
Kawasaki et al.

(10) Patent No.: US 7,921,437 B2
(45) Date of Patent: Apr. 5, 2011

(54) OPTICAL PICK APPARATUS

(75) Inventors: Ryoichi Kawasaki, Isesaki-shi (JP); Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 809 days.

(21) Appl. No.: 11/626,779

(22) Filed: Jan. 24, 2007

(65) Prior Publication Data

US 2007/0263297 A1 Nov. 15, 2007

(30) Foreign Application Priority Data

May 9, 2006 (JP) ................................. 2006-130412

(51) Int. Cl.
*G11B 7/085* (2006.01)
*G11B 7/09* (2006.01)
*G11B 7/135* (2006.01)

(52) U.S. Cl. ...... 720/669; 359/821; 359/823; 369/44.14

(58) Field of Classification Search .................. 359/814, 359/819, 821–824; 369/44.14, 44.15, 44.22; 720/669, 681–683
See application file for complete search history.

(56) References Cited

U.S. PATENT DOCUMENTS

| 5,721,723 | A | * | 2/1998 | Uchimaru et al. | ............. | 720/669 |
| 5,852,595 | A | * | 12/1998 | Matsui | ........................... | 369/116 |
| 6,021,107 | A | | 2/2000 | Tsukahara et al. | | |
| 6,314,064 | B1 | * | 11/2001 | Ueda et al. | ................. | 369/44.23 |
| 7,656,757 | B2 | * | 2/2010 | Kim et al. | .................. | 369/44.15 |

FOREIGN PATENT DOCUMENTS

| JP | 06333255 | A | * | 12/1994 |
| JP | 08329517 | A | * | 12/1996 |
| JP | 09161289 | A | * | 6/1997 |
| JP | 09297927 | A | * | 11/1997 |
| JP | 2001319358 | A | * | 11/2001 |
| WO | WO 98/02874 | | | 1/1998 |

OTHER PUBLICATIONS

English-machine translation of JP 09-297927 A (Sekimoto Y), published on Nov. 18, 1997.*
English-machine translation of JP 09-161289 A (Nakamura et al), published on Jun. 20, 1997.*

* cited by examiner

*Primary Examiner* — William J Klimowicz
(74) *Attorney, Agent, or Firm* — Fish & Richardson P.C.

(57) ABSTRACT

An optical pickup apparatus including a first objective lens that focuses first laser light on an information recording layer of a first optical disc in a first mounting state where the first optical disc is mounted on a turntable; a second objective lens that focuses second laser light on an information recording layer of a second optical disc in a second mounting state where the second optical disc is mounted on the turntable, the second optical disc having an information recording format different from that of the first optical disc; and a lens holder that integrally holds the first objective lens and the second objective lens in an adjacent manner on the outside and inside, respectively, along a radial direction of the first optical disc in the first mounting state and of the second optical disc in the second mounting state.

4 Claims, 6 Drawing Sheets

PLAN VIEW

SIDE VIEW

OPTICAL PICK APPARATUS

CROSS-REFERENCE TO RELATED APPLICATION

This application claims the benefit of priority to Japanese Patent Application No. 2006-130412, filed May 9, 2006, of which full contents are incorporated herein by reference.

BACKGROUND OF THE INVENTION

1. Field of the Invention

The present invention relates to an optical pickup apparatus.

2. Description of the Related Art

A CD (Compact Disc) is known as a medium capable of recording/reproducing information by means of infrared laser light. A DVD (Digital Versatile Disc) is known as a medium using red laser light. Also proposed are optical discs such as an HD DVD (High Definition DVD) or Blu-ray Disc (registered trademark) using bluish-violet laser light, capable of higher density recording than the above optical discs. In order to record/reproduce information on/from two different types of optical discs using laser lights of different wavelengths, some pickup apparatuses include a single lens holder mounted with an objective lens focusing red or infrared laser light for CD, DVD, etc., and with an objective lens focusing bluish-violet laser light for HD DVD, Blu-ray Disc, etc. (see, e.g., International Publication WO98/02874).

A disposition of the two objective lenses of the optical pickup apparatus relative to the optical disc can be e.g., a disposition along the direction of the radius (hereinafter, referred to an radial direction) of the optical disc or a disposition along the direction of the tangent (hereinafter, referred to as tangential direction) of tracks concentrically formed on the optical disc. A tracking control is commonly performed to cause laser light to follow a target track in the information recording/reproduction on/from the optical disc. With respect to the tracking control, there are employed in general a differential push-pull method, a three-beam method, etc., using three different laser lights (0th-order light, ±1st-order diffracted lights) that are obtained by diffracting laser lights by means of e.g., a diffraction grating. In the differential push-pull method for example, +1st-order diffracted light and −1st-order diffracted light are applied line-symmetrically with respect to the tangential direction of an information recording/reproduction target track, thereby enabling better tracking control than in the conventional push-pull method, etc. In the case of arranging the two objective lenses in the radial direction, both the objective lenses can apply +1st-order diffracted light and −1st-order diffracted light line-symmetrically with respect to the tangential direction of the information recording/reproduction target track. On the other hand, in the case of arranging the two objective lenses in the tangential direction, when one objective lens can apply +1st-order diffracted light and −1st-order diffracted light line-symmetrically with respect to the tangential direction of the information recording/reproduction target track, the other objective lens applies +1st-order diffracted light and the −1st-order diffracted light line-asymmetrically with respect to the information recording/reproduction subject track. This may result in fluctuations in amplitude of tracking error signals corresponding to the reflected lights of 0th-order light and ±1st-order diffracted lights, making infeasible the tracking control based on the differential push-pull method. Therefore, in the case of arranging the two objective lenses in the tangential direction, another push-pull method, etc., based on 0th-order reflected light is employed which may be inferior in tracking control to the differential push-pull method.

Thus, when mounting the two objective lenses on the single lens holder of the optical pickup apparatus, it is desirable to choose the disposition in the radial direction ensuring better tracking control based on the differential push-pull method for example.

In the case of disposing the two objective lenses in the radial direction, when for example the radially outside objective lens focuses laser light on a track of an information recording layer of the optical disc, the radially inside objective lens lies further radially inside than the case of the two objective lenses disposed in the tangential direction or than the case of the lens holder mounted with only a single objective lens.

As exemplarily shown in FIG. 7, when a radially outside objective lens 902 focuses laser light on, e.g., a track of a further radially inside area (hereinafter, referred to as innermost circumference of the information recording layer; than a read-in area (or PCA (Power Calibration Area)) of the information recording layer 22 of the optical disc 2, a radially inside objective lens 901 lies most inside in the radial direction. FIG. 7 is a side view of the radial disposition of the two objective lenses 901 and 902. In the exemplary view of FIG. 7, the objective lenses 901 and 902 are held by a lens holder 900 which in turn is housed in a radially shiftable housing 900 via suspension wires 920a. In the exemplary view of FIG. 7, a turntable 40 is fitted to a rotor 50 having a diameter smaller that that of the turntable 40.

As exemplarily shown in FIG. 7, even if the lens holder 900, the housing 930, etc., have specifications not requiring them to move to the further radially inside area than the read-in area (or PCA), the objective lens 901 at its lens face may butt against the turntable 40 when moving to the innermost circumference of the information recording layer 22, though a wire retaining member 900a, etc., can avoid butting thereagainst. For this reason, the objective lens 902 cannot access the innermost circumference of the information recording layer 22, making it infeasible to perform recording/reproduction on/from tracks in this area.

If reducing the diameters of the objective lenses 901 and 902 to avoid the above butting, then the effective diameter for gathering laser light also becomes smaller accordingly. As a result, when the housing 930 shifts in the radial direction to follow the disc eccentricity, etc., there may arise, e.g., a reduction in the light quantity of laser light focused on an optical disc 2 or a degradation in amplitude of a signal (e.g., reproduction signal) corresponding to the reflected light of laser light. If reducing e.g., the distance between the objective lenses 901 and 902, and the length between right ends of the lens holder 900 and of the objective lens 901 in FIG. 7 to avoid the butting, then the rigidity of the lens holder 900 becomes lower, which may induce a resonant mode unnecessary for an actuator (not shown).

If setting the level of the objective lens 901 lower than the level of the objective lens 902 with a step in the focus direction relative to the top face of the lens holder 900 in FIG. 7 to avoid the butting, the lens face of the radially outside objective lens 902 may come nearer to the disc surface of the optical disc 2 by a length corresponding to the step when the radially inside objective lens 901 is in use. This means that the working distance (WD) of the radially outside objective lens 902 becomes substantially short when the radially inside objective lens 901 is being used. For this reason, if the focus serve is out of action, then the lens face of the objective lens 902 may possibly butt against and damage the disc surface of the optical disc 2.

SUMMARY OF THE INVENTION

In order to solve the above problems, according to a major aspect of the present invention there is provided an optical pickup apparatus comprising: a first objective lens that focuses first laser light on an information recording layer of a first optical disc in a first mounting state where the first optical disc is mounted on a turntable; a second objective lens that focuses second laser light on an information recording layer of a second optical disc in a second mounting state where the second optical disc is mounted on the turntable, the second optical disc having an information recording format different from that of the first optical disc; and a lens holder that integrally holds the first objective lens and the second objective lens in an adjacent manner on the outside and inside, respectively, along a radial direction of the first optical disc in the first mounting state and of the second optical disc in the second mounting state, the lens holder being shiftable along the radial direction, a disc surface of the first optical disc in the first mounting state and of the second optical disc in the second mounting state being substantially parallel to a confronting face of the first objective lens and of the second objective lens, that confronts the disc surface, a minimum distance between the disc surface and the confronting face in a direction of a rotation axis of the turntable being greater than a thickness of the turntable in a direction of a rotation axis thereof.

The present invention thus enables the radially outside objective lens to focus laser light on the innermost circumference of the information recording layer of the optical disc without the radially inside objective lens butting against the turntable.

The other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 6A is a side view of positional relations between an optical disc having different thicknesses mounted on a turntable and an objective lens;

DETAILED DESCRIPTION OF THE INVENTION

Figure 1:
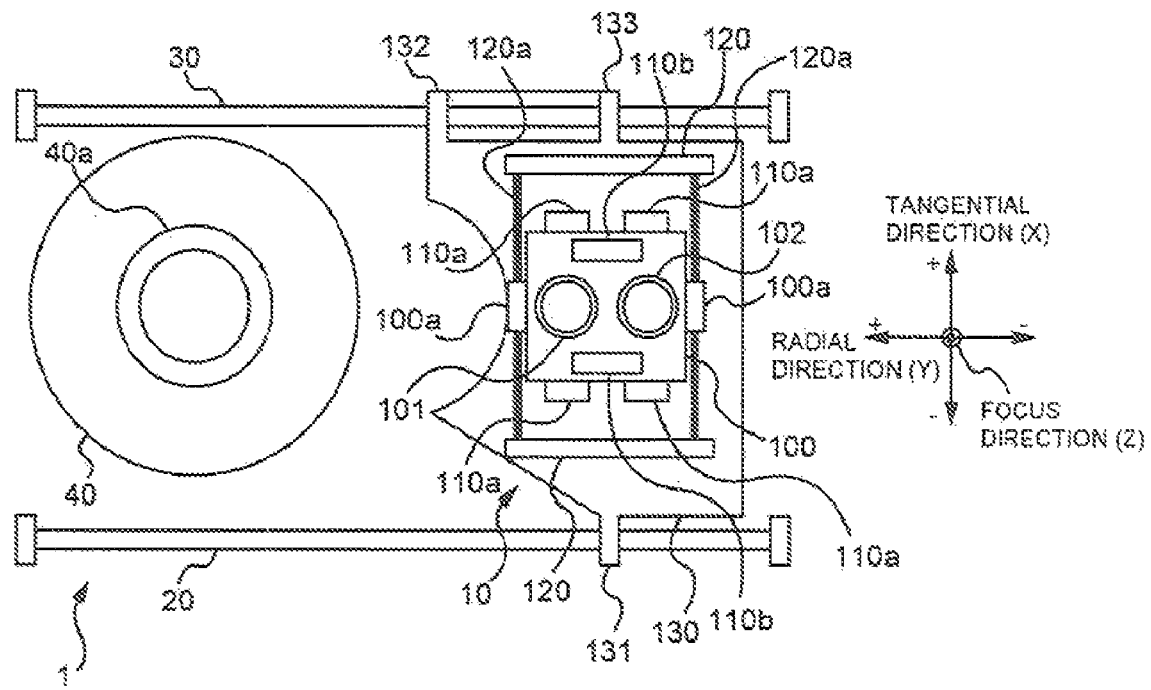
FIG. 1 shows a top plan view and a side view of an exemplary internal configuration of an optical disc apparatus including an optical pickup apparatus of this embodiment.
Figure 1:
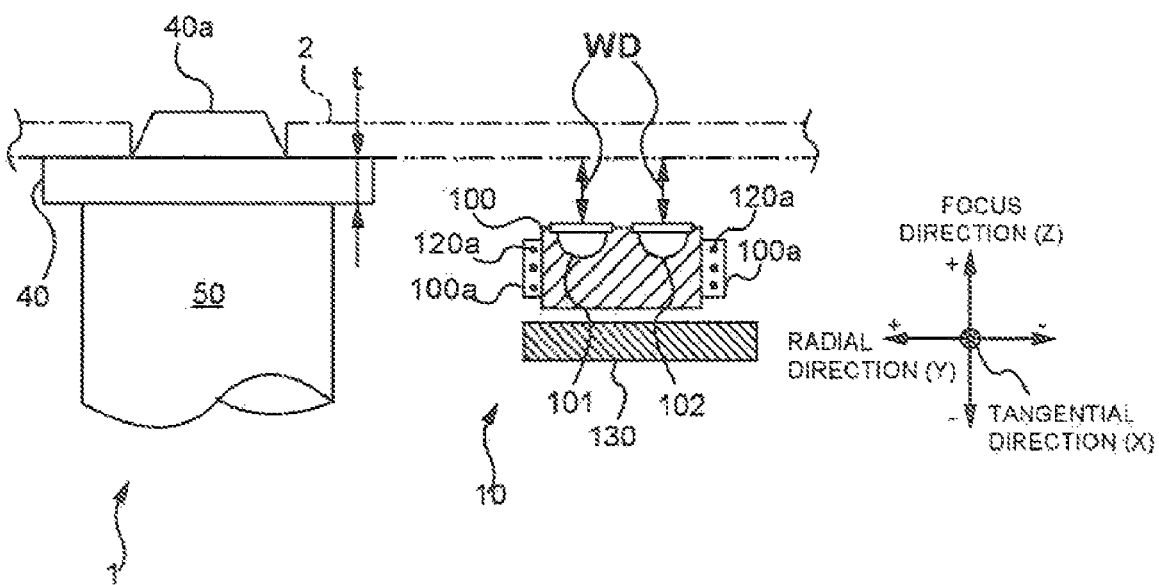

At least the following details will become apparent from descriptions of this specification and of the accompanying drawings.

Exemplary Configuration of Optical Pickup Apparatus

An exemplary configuration of an optical pickup apparatus 10 of this embodiment will be described with reference to FIGS. 1 and 2. As used in this embodiment, the radial direction refers to the direction of the radius of tracks formed on information recording layers 21 and 22 (FIGS. 3A and 3B, respectively when an HD DVD, a Blu-ray Disc, etc., (hereinafter, referred to as an optical disc 2a (FIG. 3A)) on a CD, a DVD, etc., (hereinafter, referred to as an optical disc 2b (FIG. 3B)) is mounted on a turntable 40. Herein, the optical discs 2a and 2b are referred to generically as an optical disc 2. On the other hand, the tangential direction refers to the direction of tangent of tracks formed on the information recording layers 21 and 22 when the optical disc 2 is mounted on the turntable 40.

An exemplarily shown in FIG. 1, a casing (not shown) of an optical disc apparatus 1 of this embodiment has at its bottom a given substrate (not shown) that is provided mainly with a rotor 50 of a stepping motor rotating the turntable 40 and with rails 20 and 30 that support the optical pickup apparatus 10 in a radially shiftable manner.

The turntable 40 of this embodiment is disc shaped in plan view and is provided on the top face of the cylindrical rotor 50 concentrically with a rotation axis of the rotor 50. In this embodiment, as exemplarily shown in FIG. 1, the disc diameter of the turntable 40 is set greater than the cylinder diameter of the rotor 50. The turntable 40 has at its top face a shaft 40a for concentrically fixing the turntable 40 and the optical disc 2 together.

When viewed externally, the optical pickup apparatus 10 of this embodiment is configured including mainly objective lenses 101 and 102, a lens holder 100, a housing 130, and a means for shifting the lens holder 100 relative to the housing 130.

The lens holder 100 serves to hold integrally the objective lens 101 on the radially inside and the objective lens 102 on the radially outside, in an adjacent manner with each other along the radial direction. In this embodiment, as will be described later, the objective lens 101 (second objective lens) serves to focus bluish-violet laser light (second laser light) on the information recording layer 21 of the optical disc 2a (second optical disc), while the objective lens 102 (first objective lens) serves to focus red laser light or infrared laser light (first laser light) on the information recording layer 22 of the optical disc 2b (first optical disc). This is not intended to be limitative, but the objective lens 101 may focus red or infrared laser light and the objective lens 102 may focus bluish-violet laser light.

The lens holder 100 serves to hold the two objective lenses 101 and 102 such that the lens face (confronting face) of the objective lens 101 emitting bluish-violet laser light and the lens face (confronting face) of the objective lens 102 emitting red or infrared laser light are substantially horizontal with each other (i.e., substantially parallel to the radial direction). This allows the two lens faces to become substantially parallel to the diet surface of the optical disc 2 mounted on the turntable 40. Although the two lens faces provide flat horizontal faces in the exemplary representation of FIG. 1, this is not intended to be limitative. For example, the laser light emitting sides of the objective lenses 101 and 102 may be convex, and in such a case, the lens face refers to a face defined by a most protrudent portion of the convex face.

The lens holder 100 has, at its right and left end faces in FIG. 1, wire retaining members 100a integrally formed therewith for retaining suspension wires 120a. Both ends of the suspension wires 120a are fixedly secured to a pair of fixing members 120 provided on the housing 130 so that the lens holder 100 is resiliently retained in the housing 130. Tracking coils 110a and focusing coils 110b are so disposed on the lens holder 100 as to confront magnetic members (not shown) such as magnets or yokes disposed on the housing 130 at a predetermined position. Driving the coils 110a and 110b utilizing magnetic actions enables the lens holder 100 to shift relative to the housing 130 in the radial direction and in the focus direction.

In this embodiment, the housing 130 includes locking portions 131, 132, and 133 so as to be able to shift in the radial direction in suspended by the rails 20 and 30.

As exemplarily shown in FIG. 1, the optical pickup apparatus 10 is arranged to have a working distance WD between the disc surface of the optical disc 2 mounted on the turntable 40 and the lens faces of the objective lenses 101 and 102, greater than the thickness t of the disc of the turntable 40 (WD>t). The working distance WD is a minimum distance when the objective lenses 101 and 102 come nearest to the disc surface of the optical disc 2 under the focusing control. Hereinafter, the minimum distance is referred to as "minimum working distance".

A specific example for achieving WD>t will be described hereinbelow. For example, if the relative position of the housing 130 to the turntable 40 in the focus direction is fixed in the optical disc apparatus, then the smaller the thickness of the lens holder 100 in the focus direction is, the greater the working distance WD can be. That is, the shape of the lens holder 100 achieving WD>t can be designed. WD>t may also be achieved, for example, by adjusting: the relative position of the housing 130 or the rails 20 and 30 to the turntable 40 in the focus direction; the thickness of the housing 130 in the focus direction; etc. Alternatively, for example, in the optical disc apparatus, the relative position of the turntable 40 to the housing 130 in the focus direction or the turntable 40 itself may be adjusted for achieving WD>t.

Since the working distance WD is a distance relating to the focal length of the objective lenses 101 and 102, the shape of the objective lenses 101 and 102 may need to be changed depending on the variation of the working distance WD.

<<Optical System for Optical Disc 2a>>

Figure 2:
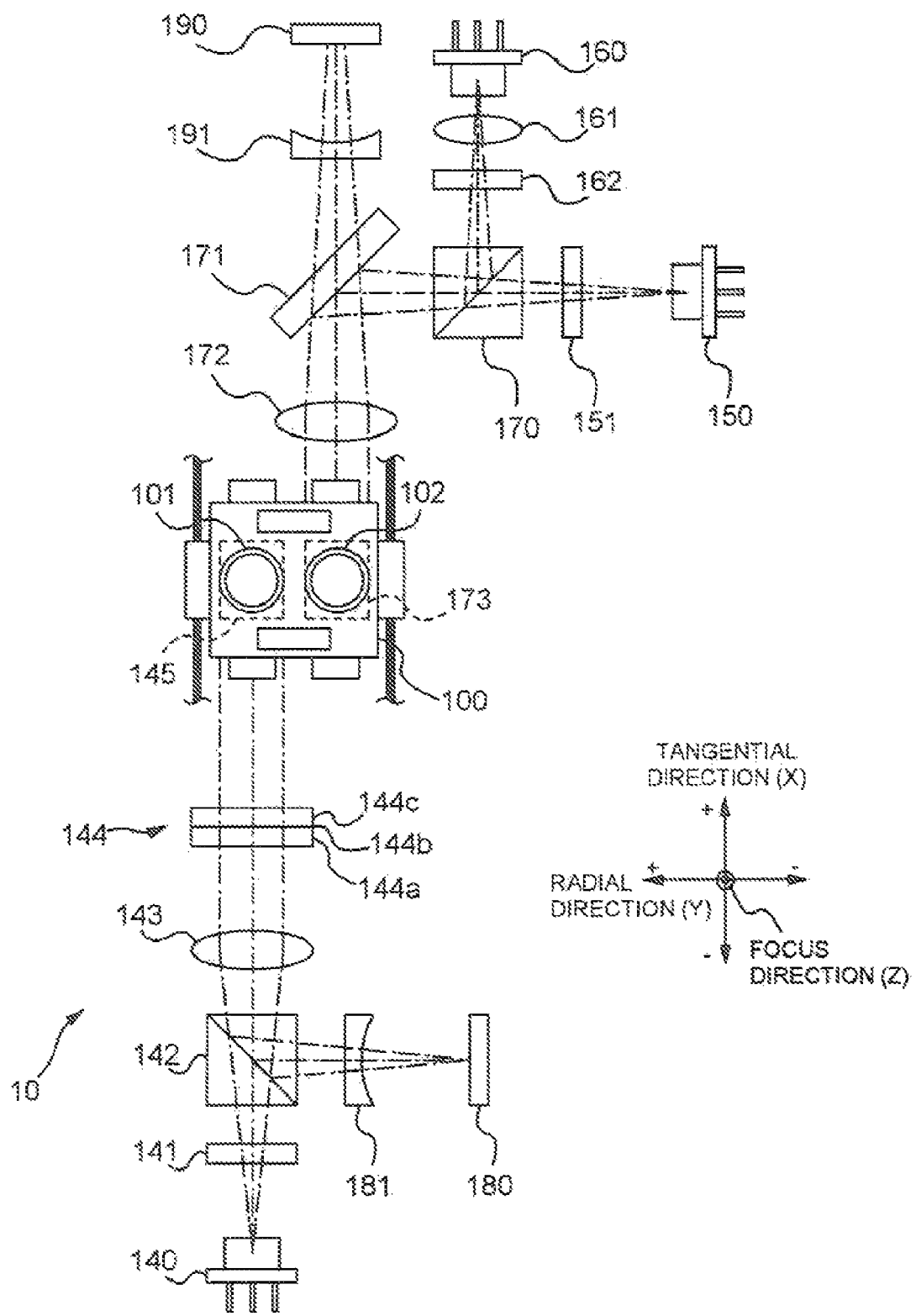
FIG. 2 is a diagrammatic representation of an exemplary overall configuration of an optical pickup apparatus of this embodiment.

As exemplarily shown in FIG. 2, a bluish-violet semiconductor laser 140 is comprised of e.g., a p-n junction diode (not shown) consisting of a p-type semiconductor and an n-type semiconductor. In response to a control voltage applied from a laser driving circuit (not shown), the bluish-violet semiconductor laser 140 emits InGaN bluish-violet laser light of a wavelength (400 nm to 410 nm) corresponding to the thickness (HD DVD: 0.6 mm, Blu-ray Disc: 0.075 mm to 0.1 mm) of a protective layer up to the information recording layer 21 of the optical disc 2a.

A diffraction grating 141 diffracts bluish-violet laser light to generate, e.g., 0th-order light and ±1st-order diffracted lights, which in turn enter a beam splitter 142.

The beam splitter 142 has a function of allowing bluish-violet laser light to pass therethrough into a collimator lens 143, and a function of reflecting the reflected light of the bluish-violet laser light from the optical disc 2a into a sensor lens 181.

The collimator lens 143 has a function of converting bluish-violet laser light to parallel light, which in turn enters a liquid crystal aberration correcting element 144, and a function of converting the reflected light of bluish-violet laser light from the liquid crystal aberration correcting element 144, into converging light, which in turn enters the beam splitter 142.

The liquid crystal aberration correcting element 144 includes glass substrates 144a and 144c that confront each other, and a liquid crystal molecular layer 144b having liquid crystal molecules sealed therein between the glass substrates 144a and 144b. The orientation of the liquid crystal molecules in the liquid crystal molecular layer 144b is set in advance along such a direction as to correct coma which may arise due to a tilt of the optical disc 2a relative to the optical axis of bluish-violet laser light. The liquid crystal aberration correcting element 144 has a function of allowing bluish-violet laser light through the liquid crystal molecular layer 144b to strike on a rising mirror 145 and a function of allowing the reflected light of bluish-violet laser light from the rising mirror 145 to enter the collimator lens 143.

The rising mirror 145 has a function of reflecting bluish-violet laser light to allow the bluish-violet laser light to enter the objective lens 101 and a function of reflecting the reflected light of bluish-violet laser light from the objective lens 101, into the liquid crystal aberration correcting element 144.

The sensor lens 181, in order to provide focusing control based on, e.g., a differential astigmatism method, imparts astigmatism to the reflected light of bluish-violet laser light from the beam splitter 142, for delivery to a photodetector 180.

The photodetector 180 has an e.g., four-split, photoreception area for receiving the reflected light of 0th-order light and the reflected lights of ±1st-order diffracted lights of bluish-violet laser light. The photodetector 180 has a function of generating an electrical signal photoelectrically converted in response to the light quantity of the reflected light of 0th-order light, to be output to a processing circuit (not shown) which follows the photodetector 180. As a result, information reproduction from the information recording layer 21 of the optical disc 2a is carried out based on the electrical signal corresponding to the reflected light of 0th-order light. The photodetector 180 also has a function of generating electrical signals photoelectrically converted in response to the light quantities of the reflected lights of ±1st-order diffracted lights, to provide the generated electric signals as its outputs together with the electrical signal corresponding to the reflected light of 0th-order light, to a servo control circuit (not shown) which follows the photodetector 180. As a result, a tracking error signal, a focus error signal, etc., are generated based on the electrical signals corresponding to the reflected lights of 0th-order light and of ±1st-order diffracted lights, so that the tracking control based on the differential push-pull method, the focusing control based on the differential astigmatism method, etc., are carried out via the magnetic members described above.

<<Optical System for Optical Disc 2b>>

A red semiconductor laser 1560 is comprised of e.g., a p-n junction diode (not shown) consisting of a p-type semiconductor and an n-type semiconductor. In response to a control voltage applied from a laser driving circuit (not shown), the red semiconductor laser 150 emits AlgaInP red laser light of a wavelength (650 nm to 660 nm) corresponding to the thickness (0.6 mm) of a protective layer up to the information recording layer 22 of the optical disc 2b.

A diffraction 151 diffracts red laser light to generate, e.g., 0th-order light and ±1st-order diffracted lights, which in turn enter a dichroic prism 170.

An infrared semiconductor laser 160 is comprised of e.g., a p-n junction diode (not shown) consisting of a p-type semiconductor and an n-type semiconductor. In response to a control voltage applied from a laser driving circuit (not shown), the infrared semiconductor laser 160 emits AlGaAs infrared laser light of a wavelength (780 nm to 790 nm) corresponding to the thickness (1.2 mm) of a protective layer up to the information recording layer 22 of the optical disc 2b.

A coupling lens 161 serves to convert the divergence angle of infrared laser light in the form of diffused light, for delivery to a diffraction grating 162.

The diffraction grating 162 serves to diffract infrared laser light to generate, e.g., 0th-order light and ±1st-order diffracted lights, which in turn enter a dichroic prism 170.

The dichroic prism 170 has a function of allowing red laser light to pass therethrough to a plate beam splitter 171 and a function of reflecting infrared laser light to the plate beam splitter 171.

The plate beam splitter 171 has a function of reflecting red laser light and infrared laser light into a collimator lens 172 and has a function of allowing the reflected lights of red laser light and of infrared laser light from the optical disc 2b to pass therethrough into a sensor lens 191.

The collimator lens 172 has a function of converting red laser light and infrared laser light into parallel light, which in turn strikes on a rising mirror 173, and a function of converting the reflected lights of red laser light and of infrared laser light from the rising mirror 173 into converging light, which in turn enters the plate beam splitter 172.

The rising mirror 173 has a function of reflecting red laser light and infrared laser light into the objective lens 102, and a function of reflecting the reflected lights of red laser light and of infrared light from the objective lens 102, into the collimator lens 172.

The sensor lens 191, in order to provide focusing control based on, e.g., the differential astigmatism method, imparts astigmatism to the reflected lights of red laser light and of infrared laser light from the plate beam splitter 171, for delivery to a photodetector 190.

The photodetector 190 has an e.g., four-split photoreception area for receiving the reflected light of 0th-order light and the reflected lights of ±1st-order diffracted lights, of red laser light and of infrared laser light. The photodetector 190 has a function of generating an electrical signal photoelectrically converted in response to the light quantity of the reflected light of 0th-order light, to be output to a processing circuit (not shown) which follows the photodetector 190. As a result, information reproduction from the information recording layer 22 of the optical disc 2b is carried out based on the electrical signal corresponding to the reflected light of 0th-order light. The photodetector 190 also has a function of generating electrical signals photoelectrically converted in response to the light quantities of light of the reflected lights of ±1st-order diffracted lights, to provide the generated electric signals as its output together with the electrical signal corresponding to the reflected light at 0th-order light, to a servo control circuit (not shown) which follows the photodetector 190. As a result, a tracking error signal, a focus error signal, etc., are generated based on the electrical signals corresponding to the reflected lights of 0th-order light and of ±1st-order diffracted lights, so that the tracking control based on the differential push-pull method, the focusing control based on the differential astigmatism method, etc., are carried out via the magnetic members described above.

Working Distance (1) of Optical Pickup Apparatus

Figure 3A:
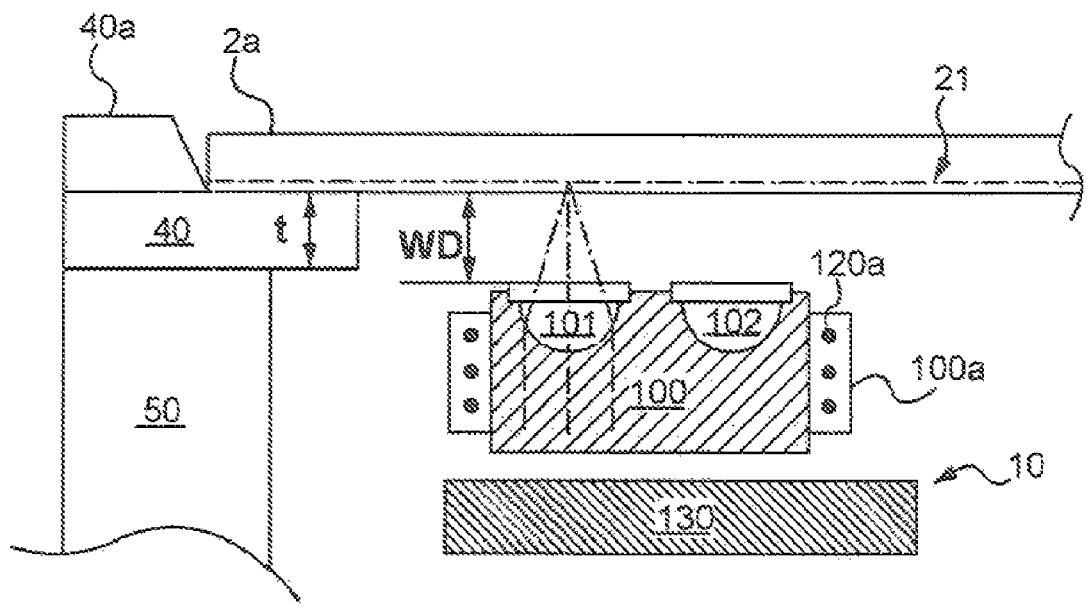
FIG. 3A is a side view of an exemplary arrangement of the optical pickup apparatus when bluish-violet laser light is focused on an innermost circumference of an information recording layer of an optical disc.
Figure 3B:
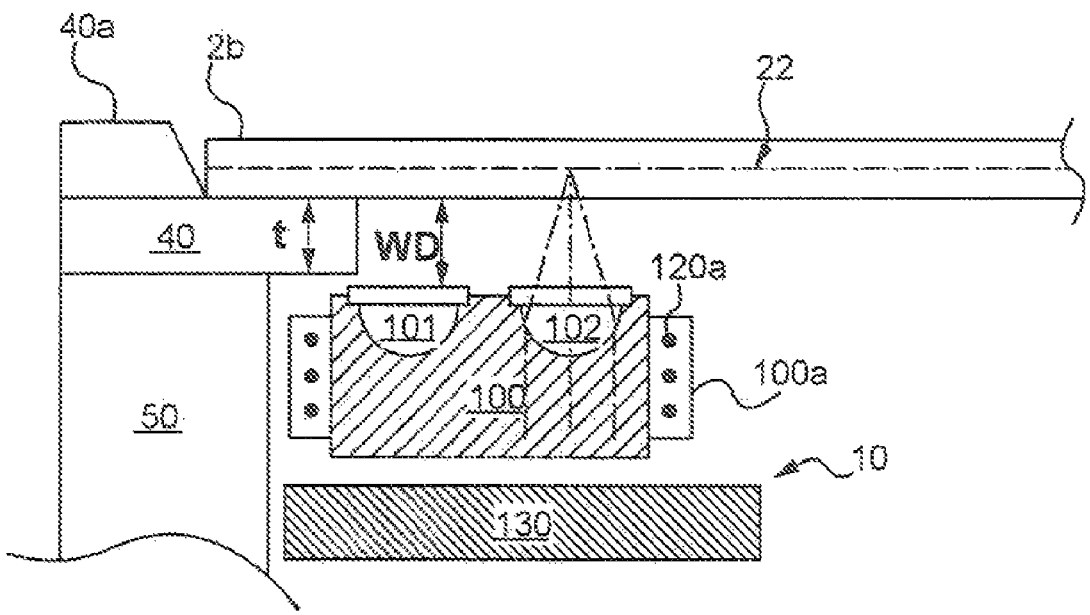
FIG. 3B is a side view of an exemplary arrangement of the optical pickup apparatus when red laser light or infrared laser light is focused on the innermost circumference of an information recording layer of an optical disc.

Referring to FIGS. 3A and 3B, description will be made of an example of the working distance WD of the optical pickup apparatus 10 described above.

An exemplarily shown in FIG. 3A, when bluish-violet laser light is focused through the objective lens 101 on the innermost circumference of the information recording layer 21 of the optical disc 2a, there exists a sufficient clearance in the radial direction between the objective lens 101 and the turntable 40 since the objective lens 101 lies radially inside of the two objective lenses 101 and 102. This enables the optical pickup apparatus 10 to access the innermost circumference without butting against the turntable 40.

As exemplarily shown in FIG. 3B, when red laser light or infrared laser light is focused through the objective lens 102 on the innermost circumference of the information recording layer 22 of the optical disc 2b, the other objective lens 101 on the radially inside and the turntable 40 may possibly overlap in the radial direction. Even in such a case, since the minimum working distance WD between the lens face of the objective lens 101 and the disc surface of the optical disc 2b is greater than the thickness t of the turntable 40, based on the above configuration, the optical pickup apparatus 10 is capable of accessing the innermost circumference without butting against the turntable 40.

The minimum working distance WD in this case is a distance between the lens face of the other objective lens 101 and the disc surface of the optical disc 2b when the objective lens 102 comes nearest to the disc surface as a result of the lens holder 100 shifting away from the housing 130 under the focusing control of the objective lens 102.

Thus, the optical pickup apparatus 10 is provided, wherein the objective lens 102 thereof on the radially outside can focus laser light on the innermost circumference of the information recording layer 21 or 22 of the optical disc 2, while the objective lens 101 thereof on the radially inside never butts again the turntable 40.

Working Distance (2) of Optical Pickup Apparatus

The relation between the minimum working distance WD and the thickness t of the turntable 40 may be corrected depending on dimensional errors of the members. As used herein, the errors refer to dimensional tolerances of the members.

Figure 4A:
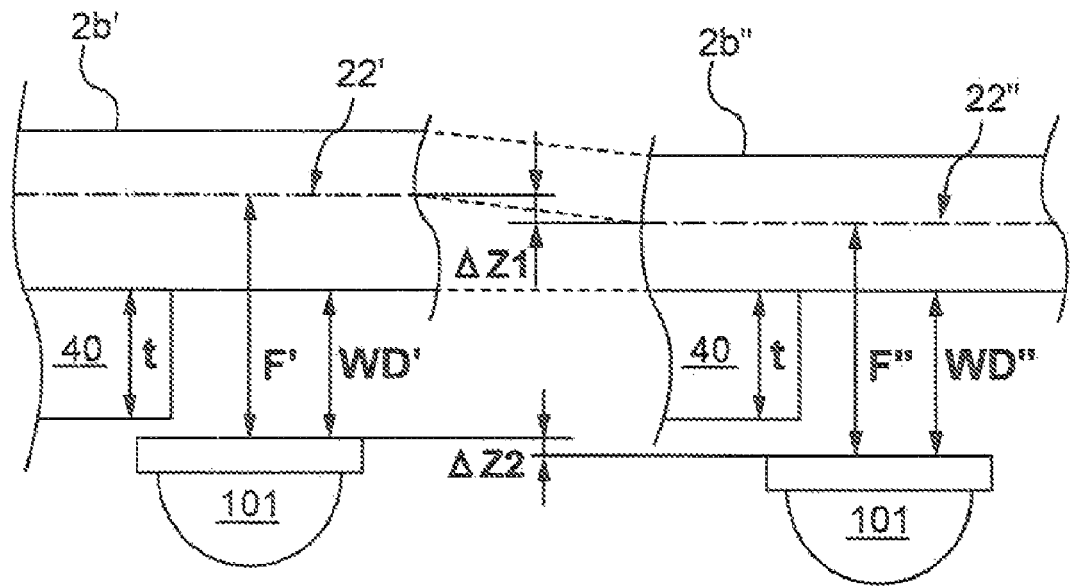
FIG. 4B is a side view of positional relations between a disc surface of an optical disc mounted on a turntable and objective lenses, which are not on the same level.

As exemplarily shown in FIG. 4A, an optical disc 2b″ having a mean thickness and optical disc 2b′ having a thickness greater than the mean thickness may possibly show a positional displacement $\Delta Z1$ in the focus direction between information recording layers 22″ and 22′ when mounted on the turntable 40. With respect to the optical disc 2b′ having a thickness greater than the mean thickness, it is desirable that a lower limit on a minimum working distance WD″ (with respect to the optical disc 2b″ having the mean thickness) be set such that a minimum working distance WD′ can be kept, which prevents the objective lens 101 from butting against the turntable 40. Consider a case where the thickness of the optical disc 2b′ is greater by $\Delta Z1$ than that of the optical disc 2b″, with the difference being reflected on the positional displacement in the focus direction between the information recording layers 22' and 22". It is conceivable in this case that WD" is greater than WD' by $\Delta Z2$ (=$\Delta 1/n$; n is a refractive index of a protective layer of the optical disc) based on the fact that a flangeback F" between the objective lens 101 and the information recording layer 22" should be equal to a flangeback F' between the objective lens 101 and the information recording layer 22' if the flangebacks F" and F' are corrected by the refractive indices n of the protective layers of the optical discs 2b" and 2b', respectively. The flangebacks F" and F' refer to a distance from the lens face (confronting face) to the focal point.

From the above, in general, let the thickness of the turntable be t, the absolute value of a thickness error of the optical disc be $\Delta Z1$, and the refractive index of the protective layer of the optical disc be n, then the minimum working distance WD needs only to meet WD$\geq$(t+$\Delta Z1/n$). Note that $\Delta Z1$ or $\Delta Z2$ corresponds to a fourth maximum error. Herein, $\Delta Z1$ may approximately be used in place of $\Delta Z2$.

Figure 4B:
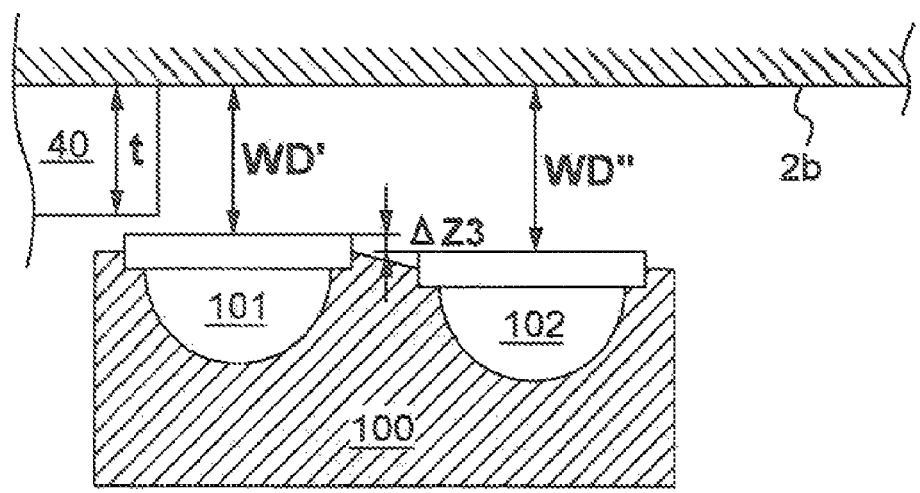

Consider a case as exemplarily shown in FIG. 4B, where the objective lens 102 lies lower than the objective lens 101 by $\Delta Z3$ as a result of positional displacement in the focus direction between the objective lens 101 and the objective lens 102. It is desirable in this case that a lower limit on a minimum working distance WD" (on the side of the objective lens 102) be set such that a minimum working distance WD' can be kept, which prevents the objective lens 101 from butting against the turntable 40.

From the above, in general, let the thickness of the turntable be t, and the absolute value of a positional displacement between the two lens faces be $\Delta Z3$, then the minimum working distance WD needs only to meet WD$\geq$(t+$\Delta Z3$). Note that $\Delta Z3$ corresponds to a sixth maximum error.

Figure 5A:
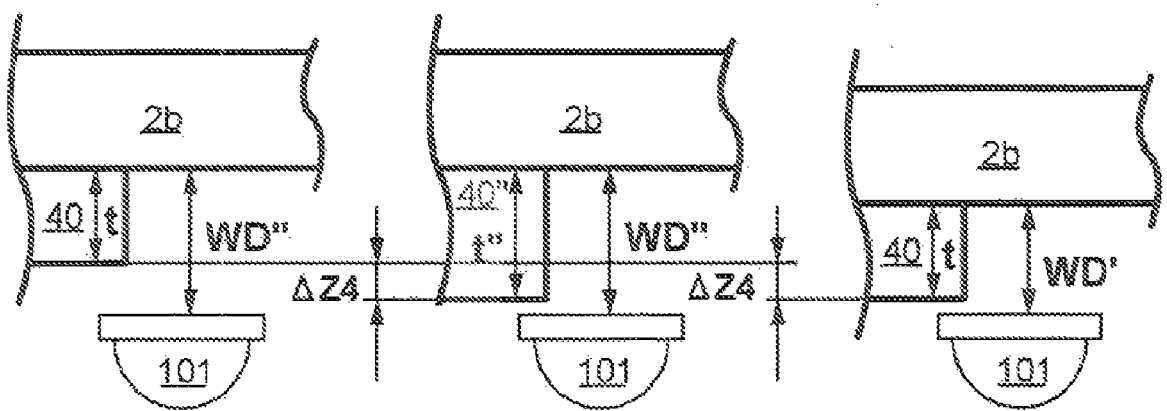
FIG. 5A is a side view of positional relations between a turntable having different thicknesses and positions and objective lens.

Consider cases as exemplarily shown in FIG. 5A where the turntable 40 has a greater thickness (the middle of FIG. 5A) and where the position of the turntable 40 in the focus direction comes nearer to the lens face (the right of FIG. 5A). It is desirable in these cases that a lower limit on a minimum working distance WD" (with respect to the turntable 40 having mean values in thickness and position) be set such that a minimum working distance WD" or WD' can be kept, which prevents the objective lens 101 from butting against the turntable 40" or 40 which has a greater thickness or which comes nearer to the lens face.

From the above, in general, let the thickness of the turntable be t, and the absolute value of a thickness error of the turntable or of a position error of the turntable in the focus direction be $\Delta Z4$, then the minimum working distance WD needs only to meet WD$\geq$(t+$\Delta Z4$). Note that $\Delta Z4$ corresponds to a first and a second maximum errors.

Figure 5B:
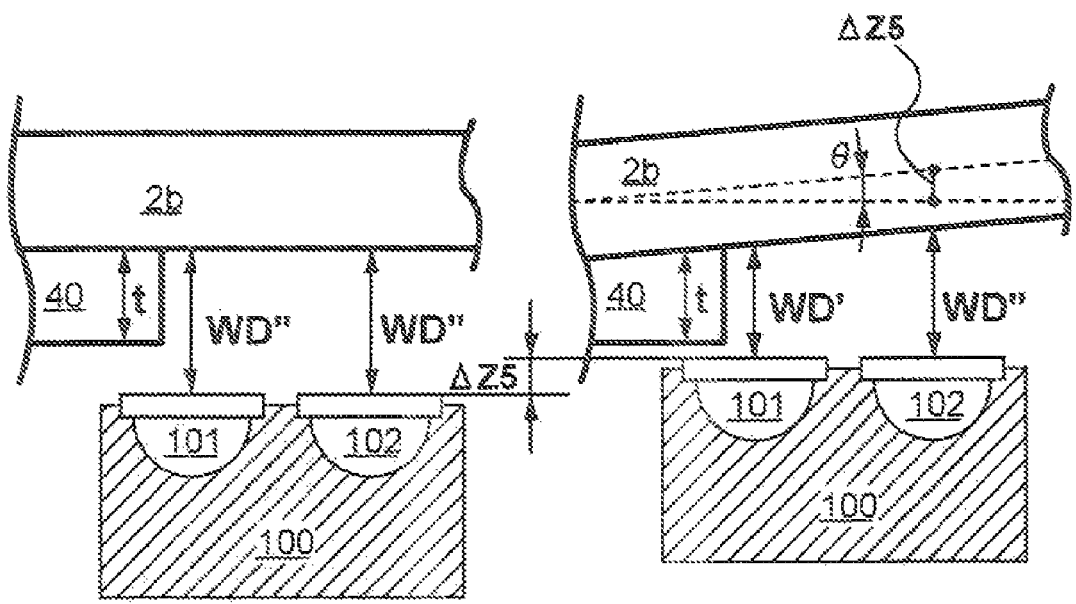
FIG. 5B is a side view of positional relations between an optical disc and a turntable that have different tilts and two objective lenses.

Consider a case as exemplarily shown in FIG. 5B where the objective lens 102 has a greater minimum working distance WD" than a minimum working distance WD' of the objective lens 101 due to a tilt of the mounting surface of the turntable 40 and/or to wobbling of the optical disc 2b in rotation. It is desirable in this case that a lower limit on a minimum working distance WD" (between the objective lens 102 and the disc surface) be set such that a minimum working distance WD' can be kept, which prevents the objective lens 101 from butting against the turntable 40. In FIG. 5B, $\theta$ is a tilt of the disc surface relative to the radial direction, and $\Delta Z5$ is a displacement in the focus direction at the innermost circumference of the optical disc 2b, arising from the tilt $\theta$.

From the above, in general, let the thickness of the turntable be t, and the displacement in the focus direction at the innermost circumference arising from the tilt of the mounting surface of the turntable or from wobbling of the optical disc be $\Delta Z5$, then the minimum working distance WD needs only to meet WD$\geq$(t+$\Delta Z5$). Note that $\Delta Z5$ corresponds to a third and a fifth maximum errors.

Working Distance (3) of Optical Pickup Apparatus

It is desirable that the lower limit on the minimum working distance WD be set taking into consideration all of $\Delta Z2$, $\Delta Z3$, $\Delta Z4$, and $\Delta Z5$ which have hereinabove been described.

Regarding $\Delta Z2$(=$\Delta Z1/n$), when the optical disc 2 is a CD, $\Delta Z1$ is the maximum, e.g., 0.1 mm, which is divided by n (e.g., 1.5) to obtain about 0.067 mm as $\Delta Z2$.

Regarding $\Delta Z3$, the relative height error between the two objective lenses is e.g., 0.05 mm.

Regarding $\Delta Z4$, the thickness error of the turntable 40 is e.g., 0.05 mm (Z4') and the height error of the turntable 40 is e.g., 0.05 mm (Z4").

Regarding $\Delta Z5$, if the tilt error of the turntable 40 is 0.1° with the innermost rack radius being e.g., 21 mm, then 21×tan (0.1°) results in about 0.037 mm (Z5'). The wobbling of the disc surface is e.g., 0.015 mm (Z5").

Finding the square root of the sum of the squares of all of 0.067 mm ($\Delta Z2$), 0.05 mm ($\Delta Z3$), 0.05 mm ($\Delta Z4'$), 0.05 mm ($\Delta Z4''$), 0.037 mm ($\Delta Z5'$), and 0.015 mm ($\Delta Z5''$), about 0.12 mm results. Thus, when taking into consideration all of the first to sixth maximum errors that have hereinabove been described, the minimum working distance WD needs only to meet WD$\geq$(t+0.12 mm). This enables the radially outside objective lens 102 to focus laser light on the innermost circumference of the information recording layers 21 and 22 of the optical disc 2 without the radially inside objective lens 101 butting against the turntable 40. Note that the value added to the thickness t of the turntable 40 is not limited to 0.12 mm but may be the square root of the sum of the square(s) of one or more of Z2, Z3, Z4', Z4", Z5', and Z5".

Figure 6:
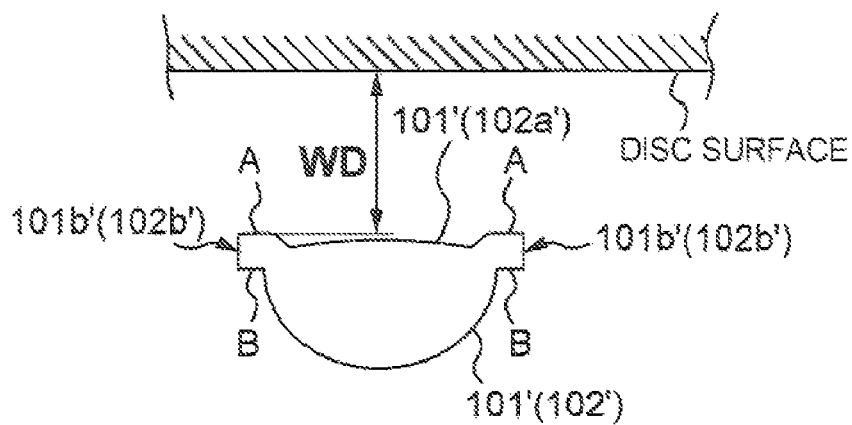
FIG. 6 is a side view of another exemplary objective lens of this embodiment.
Figure 7:
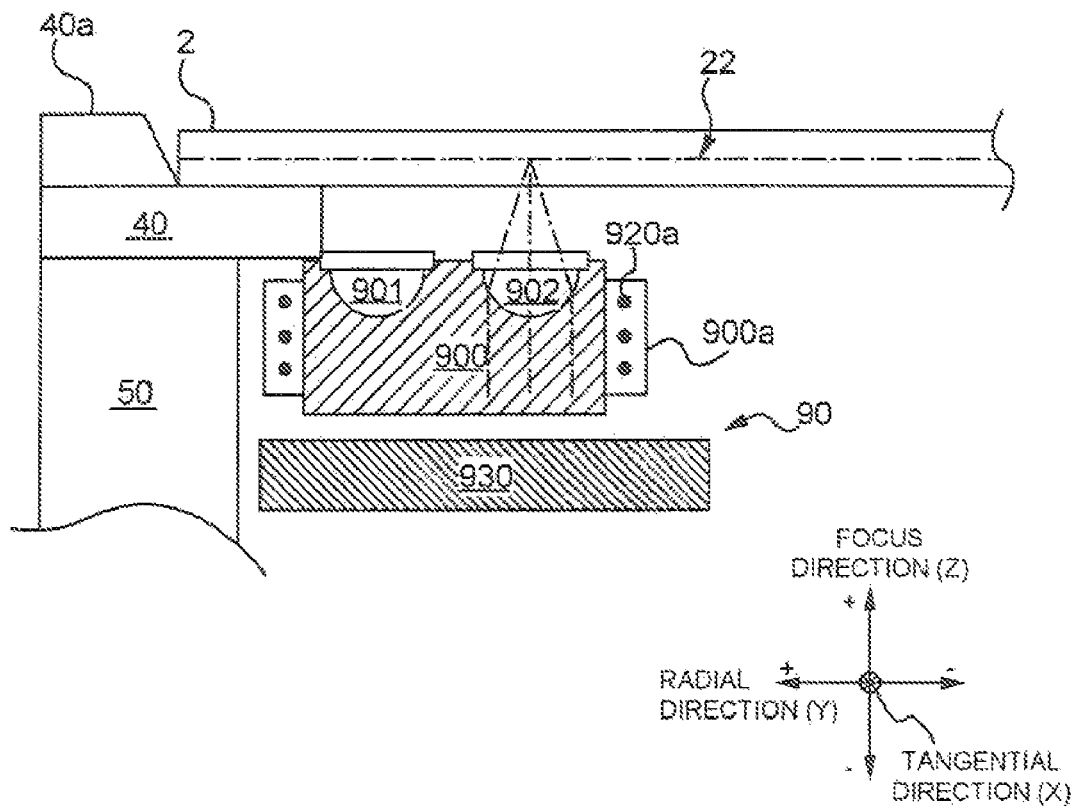
FIG. 7 is a side view of disposition of two objective lenses in the radial direction.

FIG. 6 shows another embodiment of the present invention. As shown, an objective lens 101' includes a lens unit 101a" and a rim 101b', while an objective lens 102' includes a lens unit 102a' and a rim 102b'. The two objective lenses 101' and 102' are held by the single lens holder (FIG. 1). Hereinafter, the objective lens 101', that is one of two objective lenses, will be described for the convenience of description.

The lens unit 101a' has the same function as that of the objective lens 101 described above. The rim 101b' is formed integrally with the lens unit 101a' so as to surround the periphery of the face of the lens unit 101a', the face being nearer to the disc surface, and the rim 101b' is formed so as to be of a substantially cylindrical shape with its center axis parallel to the rotation axis of the turntable 40 (FIG. 1). A face B of the rim 101b' opposite to the disc surface is a face engaged with the lens holder 100 so as to retain the objective lens 101' at a predetermined position when the objective lens 101' is dropped into the lens holder 100.

On the other hand, in the exemplary representation of FIG. 6, a face A of the rim 101b' facing the disc surface is nearer to the disc surface than the lens face of the lens unit 101a' confronting the disc surface. In the case of the objective lens 101' of plastic, for example, it can assume such a shape that its lens face becomes depressed relative to the rim 101b' in this manner. In this case, the confronting face of the objective lens 101' toward the disc surface refers to a surface composed of the lens face and the face A. The minimum working distance WD is a distance between the disc surface and the face A.

Although the above embodiments use HD DVD, Blu-ray Disc, etc., as the optical disc 2a and use CD, DVD, etc., as the optical disc 2b, this is not intended to be limitative. The optical discs 2a and 2b may be in the form of, e.g., HD DVD on one hand and Blu-ray Disc on the other hand. In this case, the same wavelength is used for the semiconductor lasers focused on the respective information recording layers.

The above embodiments of the present invention are simply for facilitating the understanding of the present invention and are not in any way to be construed as limiting the present invention. The present invention may variously be changed or altered without departing from its spirit and encompasses equivalents thereof.

What is claimed is:

1. An optical pickup apparatus comprising:
    a first objective lens that focuses first laser light on an information recording layer of a first optical disc in a first mounting state where the first optical disc is mounted on a turntable;
    a second objective lens that focuses second laser light on an information recording layer of a second optical disc in a second mounting state where the second optical disc is mounted on the turntable, the second optical disc having an information recording format different from that of the first optical disc, wherein a confronting face of the first objective lens and a confronting face of the second objective lens are substantially horizontal with each other; and
    a lens holder that integrally holds the first objective lens and the second objective lens in an adjacent manner on the outside and inside, respectively, along a radial direction of the first optical disc in the first mounting state and of the second optical disc in the second mounting state, the lens holder being shiftable along the radial direction,
    a disc surface of the first optical disc in the first mounting state and of the second optical disc in the second mounting state being substantially parallel to the confronting face of the first objective lens and the confronting face of the second objective lens, that confronts the disc surface,
    a single minimum working distance between the disc surface and the confronting faces of both the first objective lens and the second objective lens in a direction of a rotation axis of the turntable, wherein the second objective lens overlaps the turntable along the rotation axis of the turntable, when the first objective lens focuses the first laser light to access information on the information recording layer of the first optical disc, the single minimum working distance being equal to or greater than a first length obtained by adding to a thickness of the turntable in a direction of a rotation axis thereof, a second length in a direction of the rotation axis defined taking into consideration at least one of:
    a first maximum error associated with a thickness of the turntable in a direction of a rotation axis thereof;
    a second maximum error associated with a position of a mounting face of the turntable in a direction of a rotation axis thereof, the mounting face being a face on which the first optical disc and the second optical disc are to be mounted;
    a third maximum error associated with a tilt of the mounting face of the turntable relative to the radial direction; and
    a fourth maximum error associated with the disc surface in a direction of a rotation axis thereof, due to rotational wobbling of the first optical disc in the first mounting state and the second optical disc in the second mounting state.

2. The optical pickup apparatus of claim 1, wherein the second length further depends on at least one of:
    a fifth maximum error associated with a thickness of the first optical disc in the first mounting state and of the second optical disc in the second mounting state, in a direction of a rotation axis thereof; and
    a sixth maximum error in a displacement in a direction of the rotation axis between the confronting face of the first objective lens and the confronting face of the second objective lens.

3. The optical pickup apparatus of claim 1, wherein the minimum distance between the disc surface and the confronting face is equal to or greater than a length obtained by adding to a thickness of the turntable in a direction of a rotation axis thereof, a square root of a sum of at least one of:
    a square of a length in a direction of the rotation axis, defined depending on the first maximum error;
    a square of a length in a direction of the rotation axis, defined depending on the second maximum error;
    a square of a length in a direction of the rotation axis, defined depending on the third maximum error; and
    a square of a length in a direction of the rotation axis, defined depending on the fourth maximum error.

4. The optical pickup apparatus of claim 3, wherein the minimum distance between the disc surface and the confronting face is equal to or greater than a length obtained by adding 0.12 mm to a thickness of the turntable in a direction of a rotation axis thereof.

* * * * *

UNITED STATES PATENT AND TRADEMARK OFFICE
CERTIFICATE OF CORRECTION

| | | |
|---|---|---|
| PATENT NO. | : 7,921,437 B2 | Page 1 of 1 |
| APPLICATION NO. | : 11/626779 | |
| DATED | : April 5, 2011 | |
| INVENTOR(S) | : Ryoichi Kawasaki et al. | |

It is certified that error appears in the above-identified patent and that said Letters Patent is hereby corrected as shown below:

On the Title page, in field (54), in column 1, in "Title", line 1, delete "OPTICAL PICK APPARATUS" and insert -- OPTICAL PICKUP APPARATUS --, therefor.

On the Title page, in field (75), in column 1, in "Inventors", line 1, delete "Isesaki-shi (JP);" and insert -- Gunma (JP); --, therefor.

Signed and Sealed this
Twentieth Day of March, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,921,437 B2 | Page 1 of 1 |
| APPLICATION NO. | : 11/626779 | |
| DATED | : April 5, 2011 | |
| INVENTOR(S) | : Ryoichi Kawasaki et al. | |

It is certified that error appears in the above-identified patent and that said Letters Patent is hereby corrected as shown below:

On the Title page, Item (54), and at Column 1, line 1, "Title", delete "OPTICAL PICK APPARATUS" and insert -- OPTICAL PICKUP APPARATUS --, therefor.

On the Title page, Item (75), "Inventors", delete "Isesaki-shi (JP);" and insert -- Gunma (JP); --, therefor.

This certificate supersedes the Certificate of Correction issued March 20, 2012.

Signed and Sealed this
Tenth Day of April, 2012

David J. Kappos
*Director of the United States Patent and Trademark Office*